Aug. 19, 1969  R. A. RIGHTMIRE ET AL  3,462,313
ELECTRICAL ENERGY STORAGE DEVICE COMPRISING
MOLTEN METAL HALIDE ELECTROLYTE AND
TUNGSTEN-CONTAINING ELECTRODE
Filed Jan. 3, 1966
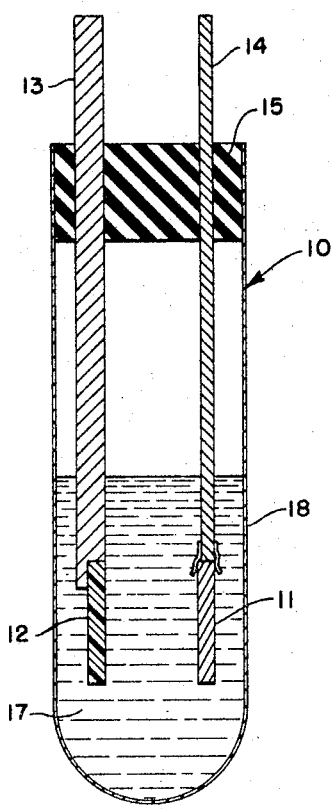
INVENTOR
ROBERT A. RIGHTMIRE
EDWARD S. BUZZELLI
BY Kramer & Sturges
ATTORNEYS 3,462,313
Patented Aug. 19, 1969

1

3,462,313
ELECTRICAL ENERGY STORAGE DEVICE COMPRISING MOLTEN METAL HALIDE ELECTROLYTE AND TUNGSTEN-CONTAINING ELECTRODE
Robert A. Rightmire, Twinsburg, and Edward S. Buzzelli, Cleveland, Ohio, assignors to The Standard Oil Company, Cleveland, Ohio, a corporation of Ohio
Filed Jan. 3, 1966, Ser. No. 518,093
Int. Cl. H01m 27/04
U.S. Cl. 136—100                                          8 Claims

ABSTRACT OF THE DISCLOSURE

An electrical energy storage device is disclosed which comprises molten metal halide as electrolyte, one electrode of tungsten, tungsten halide or a mixture thereof, with or without carbon or other conductive material. The other electrode may be of aluminum-lithium alloy.

This invention relates to electrodes for an electrical energy storage device. More particularly, the invention relates to an electrical energy storage device consisting essentially of a pair of electrodes immersed in a metal halide-containing electrolyte, at least one of the electrodes comprising a composition selected from the group of tungsten, tungsten halide, and mixtures thereof.

Electrical energy storage devices conventionally include an electrolyte in contact with a pair of electrodes, one of which is negatively charged, while the other electrode is positively charged, the electrodes being charged negatively or positively with respect to each other. The desirability of these electrical energy storage devices is based on the characteristic of high electrical energy storage per unit of total electrode volume.

Thus, it will be appreciated that the electrical energy storage capability of the electrodes is a very important factor in the total energy storage of which the device as a whole is capable.

It has now been discovered, in accordance with the present invention, that the capability for energy storage of an electrical energy storage device comprising halide-containing electrolyte can be greatly enhanced by use of a working electrode of a tungsten-tungsten halide composition. The electrode can comprise solely tungsten, substantially pure, or tungsten halide, or compositions thereof with other electrically conductive material.

Electrically conductive material can comprise, for example, carbon, graphite, boron carbide, silicon carbide, tungsten carbide, petroleum coke and conductive carbides, silicides, nitrides, oxides of metals, stable in the environment of the fused halide-containing electrolyte.

Also present as part of the composite electrode is any available binder, such as a carbonized phenolic resin or carbonized coal tar pitch.

Electrical energy storage devices comprising the working electrode of a tungsten-tungsten halide composite composition have exhibited electrical capacities in excess of 500 amp-minutes per cubic inch of electrode. This is far greater than those capacities measured using a carbon electrode in place of the tungsten-containing composite electrode. If desired, both positive and negative electrodes can be a tungsten-tungsten halide composite electrode.

It has been found that the tungsten-containing component of the electrode can vary, although not necessarily with equivalent results, from about 5 weight percent, based on total composition weight, to in excess of about 98 weight percent, based on total composition weight, the balance being conductive material. However, tungsten concentrations of about 40–60 weight percent, based on total electrode composition, are favored in most electrode-electrolyte energy storage devices. The advantages of the tungsten-containing electrode can be observed at compositions lower than 5 weight percent, but the advantages are not considered substantial.

It has been found that a working electrode comprising tungsten and/or tungsten halide in these amounts works as a reversible electrode preferably a cathode (positive) with extremely high energy storage. The tungsten-tungsten halide positive electrode of the invention gives about 250–500 percent greater capacity than an equivalent amount of a corresponding carbon electrode of a surface area of about 400 meters per sq. gram, a transverse strength of 1600 p.s.i., a resistance of 0.013 ohm/in.$^3$, and a tensile strength of about 700 lb./in.$^2$.

The particles of material, e.g. the tungsten-tungsten halide with or without other conductive material or binder, the tungsten-tungsten halide particles of which are from about 100–100,000 angstroms, comprising the composite article are mechanically blended together and mechanically pressed at a temperature of from about 50° C. to 500° C., or above the flow temperature of the binder, if used, and at a pressure of from about 1000 pounds to 50,000 pounds per square inch. Higher pressures provide greater active electrode content per unit volume of electrode. The maximum pressure limit is determined by the desired porosity in the finished electrode.

After pressing, where binder is used, the electrodes are heated in an inert atmosphere at a temperature of from about 100° C. to 1200° C. to cure and bake the binder. Inert gas (e.g. argon, helium or nitrogen) is used to control oxidation. After baking, in which considerable $CO_2$, steam and CO are evolved, and a composite mixture is formed, the electrodes are porous, strong and electrically conductive.

Before the tungsten-containing composite electrode can be used in a useful electrical energy storage device, the electrodes must be preconditioned, i.e. easily degradable components in the structure must be removed and the electrode must become permeated with electrolyte. Therefore, prior to commercial operation of the electrical energy storage device, the carbon-containing electrode assemblies, including the tungsten composite electrode, are alternately charged positively and negatively. The preconditioning of the electrodes involves immersing the electrodes in a metal and halide ion-containing electrolyte and the electrodes are alternately charged to oxidize the tungsten with halide ions and discharged to reduce the tungsten.

The above method of electrode preparation assumes a starting material of tungsten and/or tungsten halide. However, other starting materials and methods of electrode preparation are contemplated, as for example by the method of "volatile compound deposition," tungsten halide, as the starting material, in one of its higher oxidized states, e.g. $WX_6$, where X is a halide, is heated to an elevated temperature whereupon the tungsten halide is reduced and deposited in a less volatile state on a porous substrate, e.g. carbon. Other volatile tungsten compounds, as tungsten carbonyl may be used in a similar manner.

Another method of preparing the tungsten-containing electrode is by the "vapor plate" or "vapor deposition method." By this method an electrical potential is established between a substantially pure tungsten block, heated to about 3000° C., and an ambient temperature substrate, both of which are in a vacuum. Thereupon tungsten vapor is deposited on the ambient temperature substrate.

By another method of electrode preparation, a tungsten-containing solution, as for example an aqueous solution of ammonium tungstate, is prepared. A substrate is thereupon dipped into the tungsten-containing solution. Upon drying, after the solvent has vaporized, a tungsten-containing composite electrode is produced.

By yet another method, it is possible to prepare an electrode from a precursor comprising tungsten disulfide. The precursor is contacted with halogen at a temperature of about 100° C.–200° C., halogen replaces the sulfide and a usable tungsten halide electrode is produced. Other methods of electrode preparation are also contemplated. Thus, it is seen that although different starting materials are used and different methods of preparation are utilized, the finished product is a tungsten and/or tungsten halide working electrode.

Any method of electrode fabrication which produces a porous material is satisfactory. The porosity (voids between particles) of the tungsten composite electrode should be from about 15 to 70 percent in the fully discharged or reduced state, voids between composite particles being large enough to permit the electrolyte to enter freely the voids of the electrode.

The electrode opposed to the tungsten composite electrode of the electrical energy storage device of this invention can be a porous, carbon electrode conductor in the form of finely divided particulate material, e.g. a high surface area, activated carbon.

Active carbon is prepared in a two-step process comprising formation of a porous amorphous primary carbon at a relatively low temperature, followed by the removal of adsorbed hydrocarbons from the primary carbon. Step two involves the removal of adsorbed hydrocarbons by combined oxidation and distillation involving steam alone, or steam and air; the hydrocarbons of low boiling points are broken down into more volatile substances easily removed at low temperatures and under conditions less likely to result in the deposition of secondary carbon, which is inactive. During the removal by oxidation and distillation of the hydrocarbons, a loss in primary carbon by oxidation occurs; the conditions of activation must therefore be chosen so that the hydrocarbons are oxidized rapidly while the primary carbons slowly.

In one method of operation of the steam-activation process, the carbon is placed in an upright steel tube with top feed and bottom discharge. Superheated steam enters and streams downward through the carbon, carrying away the undesired hydrocarbons before they can be decomposed by the high temperature and deposit inactive carbon. In air treatment the temperature is about 350° C. to 450° C. while in the steam oxidation process, the temperature is about 800–1200° C. Other electrodes may also be used in place of the carbon, as for example, an electrode of nickel, zinc, aluminum, magnesium and lithium and combinations thereof. Of these, an aluminum-lithium alloy electrode is preferred.

The aluminum-lithium electrode can be produced by combining lithium with the aluminum by preparing a preformed alloy of aluminum and lithium, or, alternatively, electrochemically by charging a substantially pure aluminum electrode in an electrolyte containing lithium ions to the extent of about one amp.-hr. per gram of aluminum, whereby lithium is diffused into the aluminum electrode structure.

The aluminum-lithium alloy of the electrode comprises aluminum in amounts of from about 70 to 95 weight percent, based on total composition, and from about 5–30 weight percent, based on total composition, lithium. Impurities such as, for example, copper, magnesium, manganese, indium and iron may be present in quantities less than 10 weight percent, based on total composition. An aluminum-lithium electrode of this range of composition operates at substantially constant voltage and exhibits high storage capabilities.

The aluminum-lithium electrode, which functions best in a lithium halide electrolyte, is capable of storing the lithium metal of the electrolyte without forming an extensive liquid. Hence, the electrode remains solid, which solid electrode is capable of diffusing the lithium metal of the electrolyte through its structure. It has been found that on charge of the cell comprising the aluminum-lithium electrode, the electrode structure expands wherein lithium metal of the electrolyte enters the electrode structure; on discharge, the lithium metal leaves the electrode structure. The electrode must, therefore, be able to withstand the stresses of expansion and contraction. For this reason, the aluminum-lithium metal electrode is preconditioned prior to use.

The electrode material is preconditioned by slow charge and discharge initially. This slow preconditioning results in an electrode of substantially high uniform aluminum-lithium distribution porosity and which electrode facilitates the takeup and release of the lithium metal upon the subsequent fast charge and discharge of a cell containing the electrode. If the initial charge and discharge cycles of the preconditioning are carried out too rapidly, local regions of liquid metal alloy are built-up, and the result is pitting of the aluminum-lithium electrode, which pitting has a deleterious effect when the electrodes are put into routine use. Evidence of such pitting is visually evident in the aluminum-lithium electrodes, indicating lithium agglomeration. Aluminum - lithium electrodes cycled by slow charge and discharge show a fine, even distribution of the lithium metal in the aluminum.

The electrolyte used in the device of this invention is a medium comprising a source of dissociated metal and halide ions which are mobile and free to move in the medium. Fused salt mixtures containing, for example, sodium chloride, calcium chloride, calcium fluoride, magnesium chloride, lithium chloride, potassium chloride, lithium bromide and potassium bromide can be used. These salts are particularly desirable from the standpoint of their low original cost. However, other economic factors, such as the operating temperature (size and cost of insulation packing for a reasonable heating cost), corrosiveness of the electrolyte or electro-decomposition products on the cell components and purification of the electrolyte must be considered. The lower melting point electrolytes are desirable. However, it is contemplated by the present invention that the electrolyte be operable at temperatures up to about 600° C.

Typical examples of materials which can be used as electrolytes include salts of metals. Specific examples of useful binary salt electrolytes are lithium chloride-potassium chloride, potassium chloride-magnesium chloride, magnesium chloride-sodium chloride, lithium bromide-potassium bromide, lithium fluoride-rubidium fluoride, magnesium chloride-rubidium chloride, lithium chloride-lithium fluoride, lithium chloride-strontium chloride, cesium chloride-sodium chloride, calcium chloride-lithium chloride, lithium sulfate-potassium chloride, and mixtures thereof.

Examples of ternary molten salt electrolytes are calcium chloride-lithium chloride-potassium chloride, lithium chloride-potassium chloride-sodium chloride, calcium chloride-lithium chloride-sodium chloride, and lithium bromide-sodium bromide-lithium chloride.

Especially preferred systems, when using an aluminum-lithium negative electrode, are those of potassium chloride-lithium chloride and lithium bromide and potassium bromide and mixtures thereof.

A lithium chloride-potassium chloride system of 41 mole percent potassium chloride and 59 mole percent lithium chloride forms a eutectic which melts at 352° C. The potassium chloride-lithium chloride eutectic has a decomposition voltage of about 3.55 volts.

Referring more particularly to the drawing, a schematic test cell 10 of the present invention is shown. Tungsten composite electrode 12 and opposed aluminum-lithium electrode 11 are positioned one from another, in spaced relationship, immersed in an electrolyte 17 held in a heat-resistant glass tube 18. Tungsten composite electrode 12 is fixed rigidly to a graphite current carrier 13 and aluminum-lithium electrode 11 is fixed rigidly to a steel current carrier 14. The container comprising the electrolyte and electrodes is purged of atmospheric air and an inert gas introduced into the container. The open end of the container is then sealed with a cap 15 of inert material, such as lava or ceramic.

As a means of illustration only and not as limitation, the following examples are offered to illustrate the present invention.

Example I

A composite tungsten-containing electrode was prepared as follows: 90 grams of metallic tungsten powder with a particle size of 400–500° angstroms, 50 grams of petroleum coke and 20 grams of a phenolic resin binder were mixed in a mortar and pestle. The resultant material was placed in a mold one inch in diameter and heated. When the temperature of the mold reached 120° C., a force of 4000 pounds was applied. Pressure and temperature were maintained for a period of 30 minutes. The tungsten molded body was ejected from the mold and the body was baked at 900° C. for 16 hours. After cooling to room temperature, the finished body had a specific gravity of 1.8 g./cc. An electrode 1 inch by $^{5}/_{16}$ inch by $^{15}/_{32}$ inch was cut from the finished body. The electrode weight amounted to 4.53 grams.

The tungsten-containing electrode thus prepared and a ¼ inch aluminum rod were inserted through a rubber stopper and placed in a heat resistant glass test tube of an inside diameter of 32 millimeter and a depth of 200 millimeter, and filled to a total depth of about 3 inches with a molten lithium chloride-potassium chloride eutectic electrolyte, maintained at a temperature of 450° C. The interelectrode distance was ¼ inch. The cell thus prepared was purged of air and an argon atmosphere established within the cell.

The cell was connected to external circuitry such that the aluminum electrode was maintained negative, the tungsten-containing electrode positive and the cell could be charged to a maximum of 3.6 volts and discharged under conditions of constant current to a minimum voltage of one volt. The discharge current amounted to 100 milliamperes. After two days of cycling on a constant voltage charge, constant current discharge, the cell delivered energy equivalent to 455 watt min./in.$^3$ of tungsten electrode.

Example II

The process of Example I was repeated in all details except that an electrode of 50 grams of metallic tungsten, 45 grams of activated carbon powder (FC–13, Pure Carbon Company) and 5 grams of phenolic binder were utilized. The cell thus prepared, as in Example I, when cycled, between 3.7 and 1.0 volts had an energy storage equivalent to 608 watt min./in.$^3$ of tungsten electrode, three days after cell startup.

Example III

The process of Example I was repeated in all details except that the tungsten-containing electrode had the following composition; 80 grams metallic tungsten, 15 grams of activated carbon (FC–13, Pure Carbon Company) and 5 grams of phenolic resin binder. The cell thus prepared, as in Example I, when cycled, between 3.7 and 1.0 volts had an energy storage equivalent to 475 watt min./in.$^3$ of tungsten electrode, three days after cell startup.

Example IV

The procedure of Example I was repeated in all details except that the tungsten-containing electrode had the following composition; 18 grams of metallic tungsten powder, 1 gram of powdered activated carbon (FC–13, Pure Carbon Company) and 1 gram of phenolic resin binder. After five days of cycling, the cell delivered, between the limits of 3.6 and 1.0 volts at 50 milliamperes discharge current, energy storage equivalent to 273 watt-min./in.$^3$ of tungsten electrode.

It has been found that an energy storage device of this invention has demonstrated energy storage at least about 5 times as great as presently known energy storage devices.

The device of the present invention operates efficiently in a pressure range of about 1 p.s.i.g. to 1000 p.s.i.g. under an atmosphere of inert gas (e.g. He, A, Kr). It has been found that pressure has an effect on the oxidation conditions of the tungsten and that pressure retards the degradation of the tungsten composite electrode.

Since the electric energy storage device operates above ambient temperature, a means of heating is provided.

The electric energy storage devices herein described lend themselves to connection with units of similar construction, either by connection of a number of units in series and parallel, or by utilization of a stack of electrodes.

The embodiments of the invention in which an exclusive property or privilege is claimed are defined as follows. What is claimed is:

1. A secondary electrical energy storage device operable above the melting point of the electrolyte under an atmosphere of inert gas, comprising in combination:
    (a) a pair of spaced electrodes, one of which electrodes consists essentially of tungsten, tungsten halide, or a mixture thereof, and
    (b) in contact with the electrodes, a molten electrolyte consisting essentially of one or more halides of an alkali metal or an alkaline earth metal or a combination thereof.

2. The storage device of claim 1 in which the described electrode comprises a substantial amount of another conductive material which is stable in the presence of the electrolyte when molten, in addition to said tungsten, tungsten halide or a mixture thereof.

3. The storage device of claim 2 in which the conductive material is carbon.

4. The storage device of claim 1 in which there is a second electrode selected from carbon, nickel, zinc, aluminum, magnesium and lithium and combinations thereof.

5. The storage device of claim 4 in which the second electrode is an alloy of aluminum-lithium.

6. The storage device of claim 1 in which the electrolyte consists essentially of a lithium salt.

7. A method of storing electrical energy, comprising the steps of
    (a) providing an electrolyte of one or more halides of an alkali metal or an alkaline earth metal or a combination thereof, which electrolyte is solid at ambient temperatures,
    (b) heating the electrolyte to above its melting point,
    (c) immersing a pair of electrodes in the electrolyte to form an electrical energy storage cell, one of the electrodes comprising a composition selected from the group consisting of tungsten and tungsten halide and mixtures thereof,
(d) pre-conditioning the electrode, and
(e) charging the cell electrically;
(f) the steps of immersing, pre-conditioning and charging being done while the electrolyte is at a temperature at, or above its melting point.

8. The method of claim 7 in which the second electrode of said pair is aluminum-lithium alloy.

References Cited

UNITED STATES PATENTS

| 2,709,154 | 5/1955 | Hansgirg | 204—39 |
| 2,825,703 | 3/1958 | Conant | 75—176 |
| 2,937,219 | 5/1960 | Minnick et al. | 136—6 |
| 2,946,836 | 7/1960 | Justi et al. | 136—120 |
| 3,043,896 | 7/1962 | Herbert et al. | 136—6 |
| 3,093,514 | 6/1963 | McCallum et al. | 136—100 |
| 3,160,531 | 12/1964 | Spindler | 136—120 |
| 3,236,694 | 2/1966 | Stenger et al. | 136—83 |
| 3,343,948 | 9/1967 | Raclot | 75—138 |

WINSTON A. DOUGLAS, Primary Examiner

A. SKAPARS, Assistant Examiner

U.S. Cl. X.R.

136—83, 90, 153

UNITED STATES PATENT OFFICE
CERTIFICATE OF CORRECTION

Patent No. 3,462,313　　　　　　　　　　　August 19, 1969

Robert A. Rightmire et al.

It is certified that error appears in the above identified patent and that said Letters Patent are hereby corrected as shown below:

Column 5, line 33, "400-500°" should read -- 4000-5000° --.

Signed and sealed this 21st day of April 1970.

(SEAL)
Attest:

Edward M. Fletcher, Jr.　　　　　　　　WILLIAM E. SCHUYLER, JR.
Attesting Officer　　　　　　　　　　　　　Commissioner of Patents